United States Patent [19]

Parry et al.

[11] Patent Number: 4,971,092

[45] Date of Patent: Nov. 20, 1990

[54] PIVOTAL CONTROL HOUSING

[75] Inventors: Thomas C. Parry, Holt; John W. Brown, Harrisonville, both of Mo.

[73] Assignee: Mobile Hydraulic Equipment Company, Summit, Mo.

[21] Appl. No.: 392,886

[22] Filed: Aug. 14, 1989

[51] Int. Cl.⁵ ............................................. A01M 7/00
[52] U.S. Cl. ............................ 137/351; 137/382; 137/637.1; 137/899.4; 180/89.17; 296/37.6
[58] Field of Search .................. 137/637, 637.1, 351, 137/354, 382, 899, 899.4, 377; 180/89.16, 89.17; 296/37.6

[56] References Cited

U.S. PATENT DOCUMENTS

| | | | |
|---|---|---|---|
| 1,277,427 | 9/1918 | Knauf | 137/637.1 |
| 2,337,659 | 12/1943 | Hughey et al. | 137/637.1 |
| 2,714,291 | 8/1955 | Gleeson | 137/382 |
| 3,648,720 | 3/1972 | Kornahrens | 137/351 |
| 4,096,878 | 6/1978 | Adams et al. | 137/351 |
| 4,327,599 | 5/1982 | Friede | 137/637.1 |
| 4,423,980 | 1/1984 | Warnock | 296/37.6 |
| 4,635,676 | 1/1987 | Reilley | 137/382 |

*Primary Examiner*—A. Michael Chambers
*Attorney, Agent, or Firm*—Hovey, Williams, Timmons & Collins

[57] ABSTRACT

A pivotal control housing for enabling service access to a hydraulic control circuit is provided which is particularly useful with multi-power source service vehicles and includes hinge structure for enabling pivoting of the housing between an upright orientation and a horizontal position for servicing. The housing includes an access opening in the rear and enables the circuit to be easily accessed and serviced on the vehicle. The housing advantageously includes a pivotally mounted abutment bar for preventing the simultaneous opening of two valves leading to a single output which would otherwise overload the output.

7 Claims, 3 Drawing Sheets

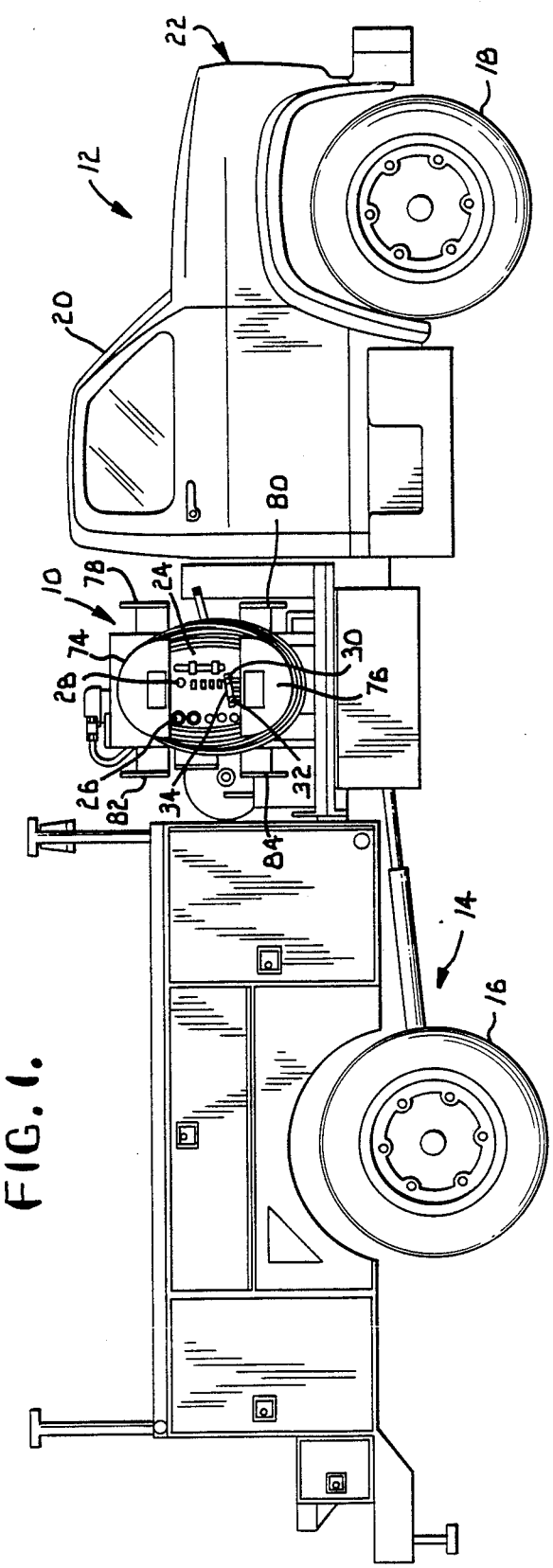
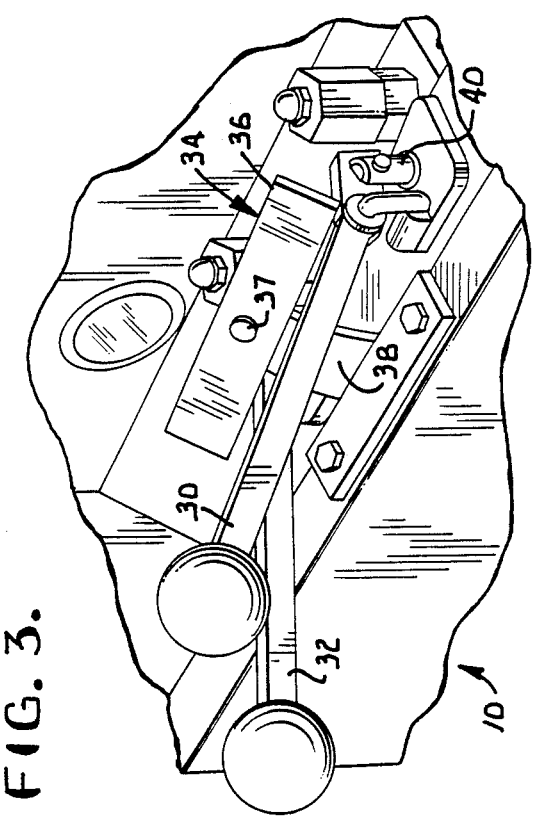
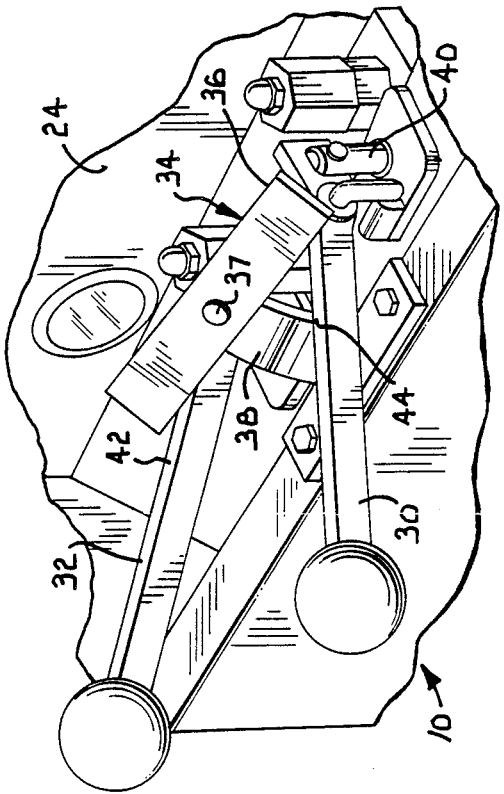

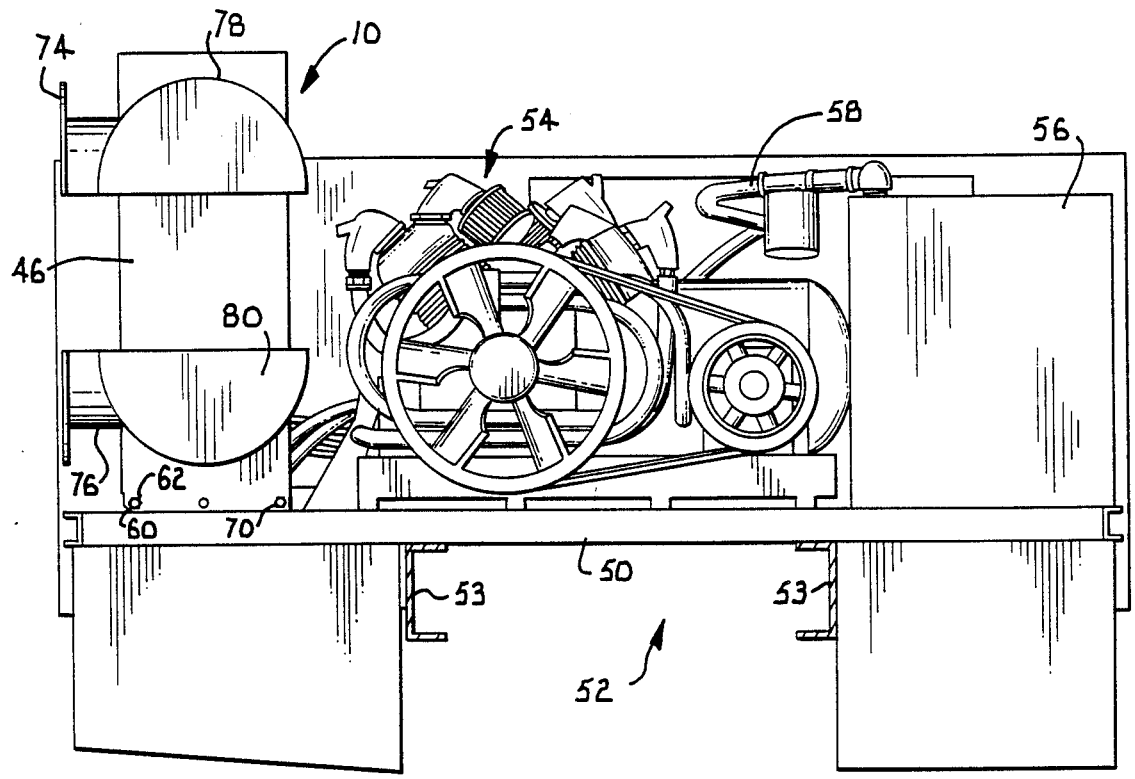
FIG. 4.
FIG. 5.
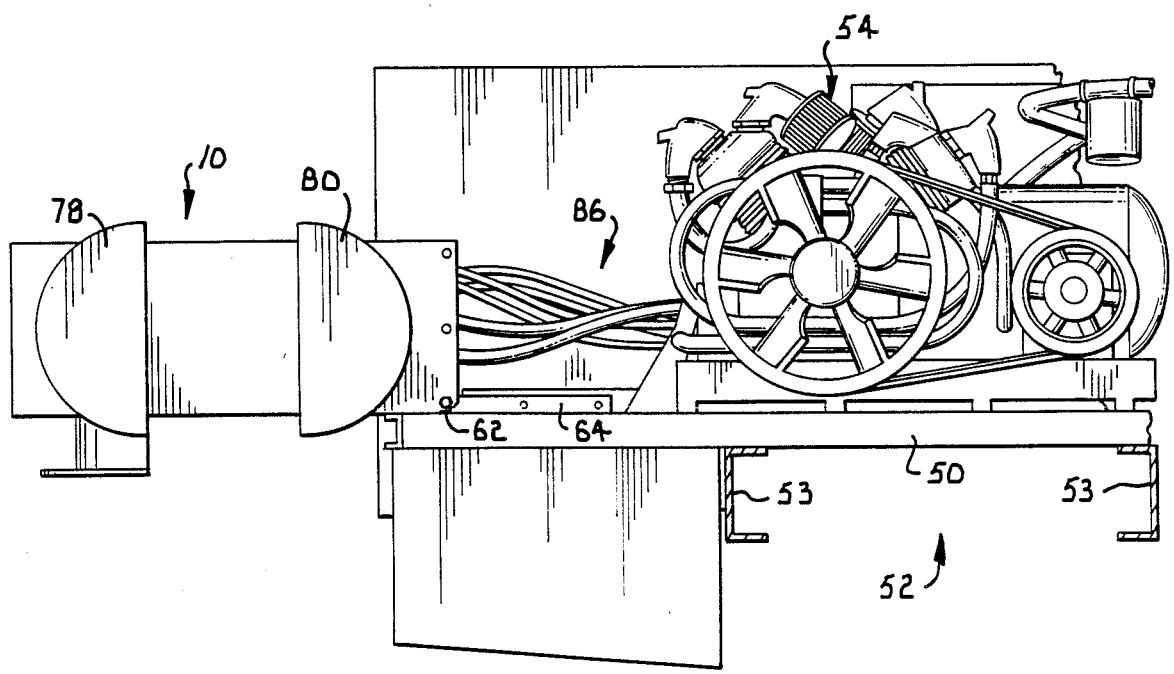

PIVOTAL CONTROL HOUSING

BACKGROUND OF THE INVENTION

1. Field of the Invention

This invention relates to a housing mounted on a vehicle which provides easy and effective access for servicing and maintaining hydraulic control components housed therein by virtue of its pivotal mounting to the vehicle. More particularly, it is concerned with a vehicle having a control housing mounted thereon whereby the housing is provided with structure enabling it to pivot between a substantially upright position for normal operation and a horizontal position for servicing and maintenance. The invention also discloses the use of a control limiter for preventing simultaneous opening of a plurality of valves to a single hydraulic tool circuit to prevent overloading of the tool circuit from excessive hydraulic input.

2. Description of the Prior Art

The advantages of using hydraulic power to operate a variety of hand held and vehicle mounted equipment are increasingly becoming recognized by individuals and companies who must operate service vehicles in remote locations. Hydraulic powering circuits avoid difficult and complicated mechanical transmissions which are difficult to relocate or extend for remote operations. Electrical power avoids some of these difficulties, but involves inherent losses in converting mechanical power to electric power, as well as being limited in the amount of power an electrical conduit can effectively and efficiently transmit. Thus, hydraulic power circuits represent, in certain environments, advantages over either mechanical or electrical power transmission.

In some operations, it may be desirable to provide pneumatic, electrical and hydraulic power outlets for use at a remote site. In such applications, the hydraulic unit may be used to power not only hydraulic tools but also either an air compressor for pneumatic tools or an alternator for electrical power supply. In such circumstances, the hydraulic power circuit may involve a series of controls, dials and valves in order to enable selective operation of each of the circuits.

However, in such multi-function units, it has often been difficult to efficiently locate and effectively connect the various tool-powering circuits. In particular, when the housing carrying the control mechanisms and valving is mounted on the vehicle, it must often be in close proximity to the other power supply components, making maintenance extremely difficult. Routine maintenance operations have ordinarily been difficult to effect or required removal of the entire control unit housing, operations which made repairs more time consuming and expensive.

In addition, the control housing has advantageously been equipped to provide hydraulic power to the air compressor, alternator or to a single tool-powering circuit. However, users of the vehicle may attempt to employ two tool circuits simultaneously, when in fact only one circuit is available. When a tandem output hydraulic pump is used and valves from both pump outputs are opened to a single tool circuit, the resultant overloading of the system results in intermittent operation of the hydraulically powered tool circuits and eventually system overload and failure. Thus, the maintenance problem has been increased by the failure to provide a suitable limiting device which permits alternate opening of valves leading to a single tool output circuit.

SUMMARY OF THE INVENTION

These problems are in large measure solved by the control housing of the present invention. That is to say, the control housing hereof is pivotally mounted to the vehicle for enabling easy access to the rear of the housing for maintenance operations, while also including a control limiter for preventing simultaneous actuation of two valves leading to a single hydraulic tool output circuit.

The control housing hereof is pivotally mounted to the vehicle by securement at the bottom front corner thereof, whereby the housing may be pivoted between a substantially upright position and a substantially horizontal position while still mounted on the service vehicle. The housing is preferably provided with side panel corners which are cut diagonally at the front bottom corner to enable free clearance of the control housing during the pivoting operation. Advantageously, the control housing is hingedly mounted by bolts or the like to the service vehicle whereby, by removing bolts at the rear of the housing, the housing may be tilted to provide easy access to an open back area of the housing, thereby enabling free access to the unit for routine servicing operations.

Moreover, the control housing hereof also includes a pivotally mounted bar oriented for engagement with the hydraulic circuit actuating levers for each of the hydraulic circuit valves and serving to prevent simultaneous opening of the valves to a single tool circuit. Actuation of one of the control levers will cause the bar to pivot downwardly on the opposite side, thus preventing actuation of the other control lever at the same time. While both control levers may be positioned in an "off" position with respect to operation of the tool circuit, the pivotal abutment bar is oriented for engagement with both of the levers such that both control levers may only be alternately shifted to an "on" position. The pivotally mounted abutment bar thus serves as a limiter to prevent overloading of the hydraulic circuit by activation of two output circuits simultaneously.

BRIEF DESCRIPTION OF THE DRAWING

FIG. 1 is a horizontal elevation view of a service vehicle mounting a control housing having a limiter oriented for engagement with the control levers thereon;

FIG. 2 is an enlarged, fragmentary perspective view of the control levers and an abutment bar of the limiter shown in FIG. 1, with one of the levers raised to actuate a hydraulic output;

FIG. 3 is an enlarged, fragmentary perspective view similar to that of FIG. 2, showing the other control lever raised to actuate the other hydraulic circuit, with the abutment bar pivoting to prevent simultaneous actuation of the first control lever;

FIG. 4 is an enlarged, fragmentary sectional view taken through the rear of the cab of the service vehicle shown in FIG. 1, showing the pivotally mounted control housing oriented in a first, upright position;

FIG. 5 is a fragmentary sectional view similar to that shown in FIG. 4, with the control housing pivoted to a horizontal orientation;

DETAILED DESCRIPTION OF THE DRAWING

Figure 6:
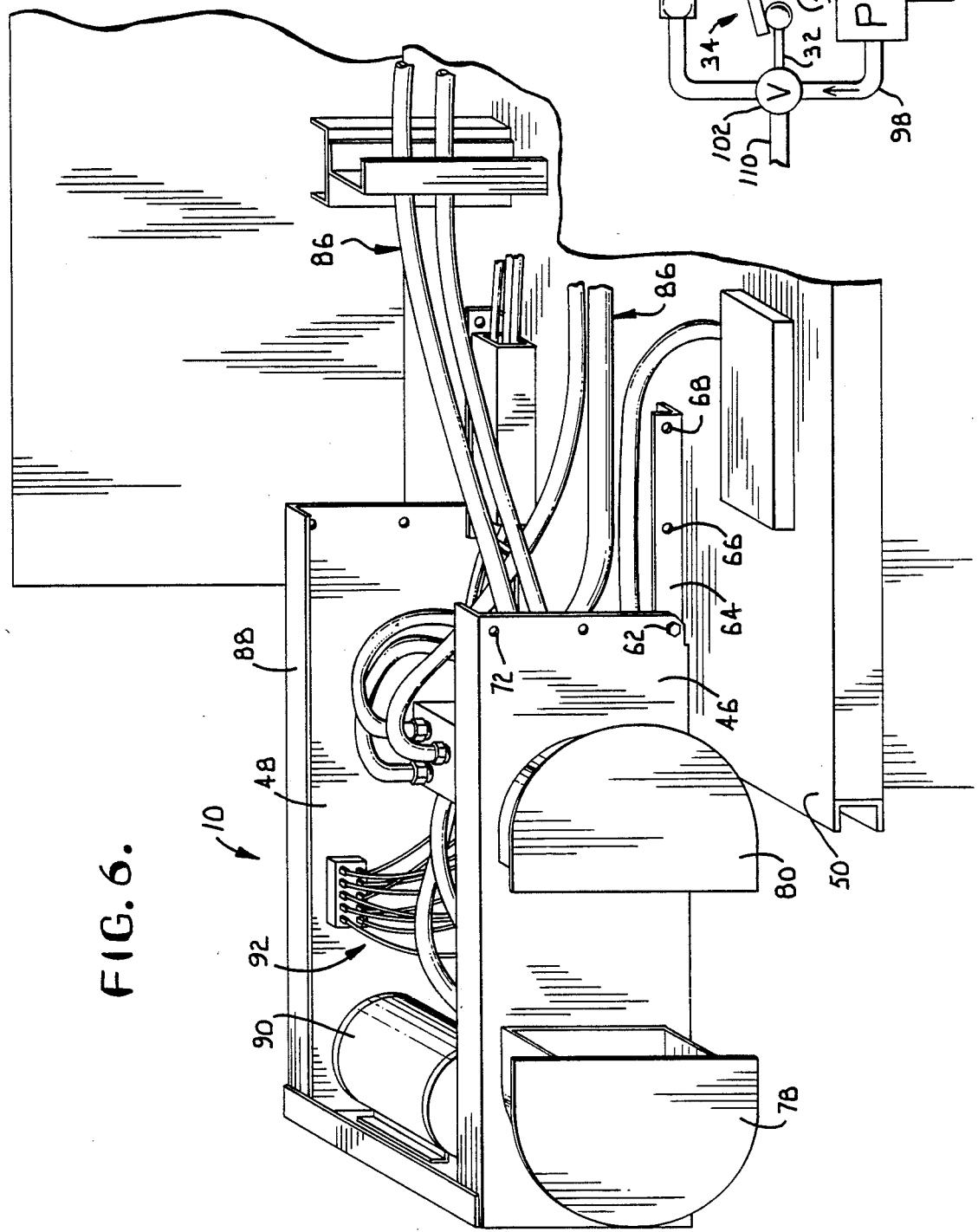
FIG. 6 is an enlarged, fragmentary perspective view similar to FIG. 5 with the compressor unit removed for clarity showing the access to the rear of the control housing.

Referring now to the drawing, a pivotally mounted control housing 10 is adapted for use with a service vehicle 12 which broadly includes a wheeled undercarriage 14 including rear wheels 16 and front wheels 18. The vehicle also includes a cab 20 and an engine unit 22 for supplying a source of self-contained power for the vehicle. The engine unit 22 includes a tandem output hydraulic pump 94 connected to the output shaft of the engine for transmitting power generated by the engine into a hydraulic circuit.

In greater detail, the control housing 10 includes front panel 24 displaying dials 26 and switches 28 for monitoring and operating the hydraulic circuit herein. Additionally, located at the front panel is first control lever 30 and second control lever 32 for respectively operating valves hydraulically connected to the hydraulic pump. Limiter 34 is located intermediate first control lever 30 and second control lever 32 for preventing simultaneous actuation of both levers to operate a single tool circuit output, as will be described hereinafter.

Turning now to FIG. 2, limiter 34 is positioned intermediate first control lever 30 and second control lever 32 whereby the pivotally mounted abutment bar 36 connected by pivot pin 37 to mount 38 is oriented for simultaneous engagement with levers 30 and 32. Lever 30 is connected by linkage 40 to three-way valve 100 whereby shifting control lever 30 to an "up" position actuates the hydraulic tool circuit. When in an intermediate position, control levers 30 and 32 are "off" and the valves to which they are connected return the hydraulic fluid to reservoir 56. Shifting control lever 30 downwardly to a lowered position opens the three-way valve 100 to hydraulically power and thus actuate compressor unit 54. Alternately, control lever 32 may also be similarly depressed to move linkage 40 and thereby open three-way valve 102 to hydraulically power an electric current producing unit such as generator 90.

As may be seen in FIGS. 2 and 3, the pivotally mounted bar 36 is oriented for engagement with the upper sides 42 and 44 of control levers 30 and 32 respectively, whereby abutment bar 36, by contacting upper sides 42 and 44, will prevent simultaneous raising of both levers 30 and 32. As shown in FIG. 2, control lever 32 is raised into a hydraulic tool circuit actuating position, whereby upper side 42 engages bar 36 and causes the right side thereof, as seen in FIG. 2, to move downwardly and prevent the raising of control lever 30 to also open a valve for the same hydraulic tool circuit.

Similarly, as shown in FIG. 3, control lever 30 is raised, causing the right side of abutment bar 36 to elevate and the left side to move downwardly to prevent the raising of control lever 32. Because both the control levers 30 and 32 are connected mechanically by linkages 40 to three-way valves 100 and 102, respectively, both control levers 30 and 32 may not be raised simultaneously and thus the hydraulic tool output circuits may not be simultaneously supplied by both ends of tandem pump 94. However, it may be appreciated that both control levers 30 and 32 may be depressed simultaneously to activate both the compressor 54 and generator 90, or one or the other of the control levers 30 or 32 raised while the other control lever is depressed to activate the compressor 54 or generator 90, respectively.

Figure 7:
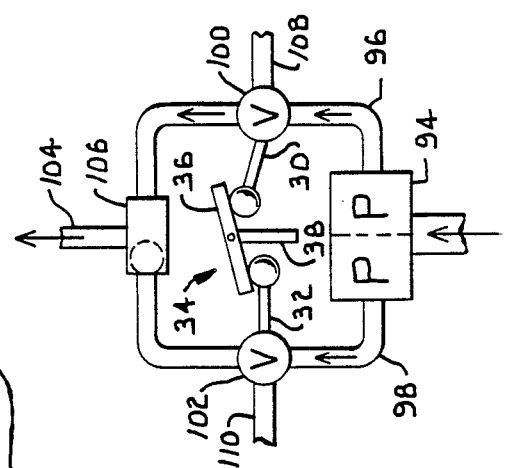
FIG. 7 is a schematic view of a tandem output hydraulic pump providing outputs to valves linked to the control levers and leading to an alternator, a compressor and single tool circuit.

FIG. 7 best illustrates the operation of the limiter 34 in the present application. Pump 94 is a tandem-type pump connected to engine unit 22, having a hydraulic input 112 leading from fluid reservoir 56 and having two hydraulic outlets 96 and 98. Outlets 96 and 98 lead respectively to three-way valves 100 and 102. As described hereinabove, valves 100 and 102 are connected by linkages 40 to control levers 30 and 32. As shown in FIG. 7, valve 100 is open to supply hydraulic fluid under pressure to the hydraulic tool circuit 104 through shuttle valve 106 when control lever 30 is raised. When in an intermediate position, the valve 100 is closed, returning the hydraulic fluid to reservoir 56 through return line 114. A similar return line 116 provides a return from three way valve 102 when it is in the "closed", intermediate position. When depressed, valve 100 opens to supply hydraulic fluid under pressure to supply hose 108 leading to compressor unit 54.

Also as shown in FIG. 7, pump 94 also supplies hydraulic fluid under pressure to outlet 98 leading to three-way valve 102. As shown in FIG. 7, because control lever 30 is raised, pivotally mounted bar 36 prevents control lever 32 from being raised to also supply fluid under pressure to shuttle valve 106. It may be appreciated that simultaneous opening of both valves 100 and 102 to shuttle valve 106 would lead to intermittent feed of hydraulic fluid to the circuit and eventual heat build up and breakdown of the valve 106. However, lever 32 may be depressed to open valve 102 to supply hose 110 leading to generator 90.

Turning now to FIGS. 4–6, it may be seen that the control housing 10 includes side panels 46 and 48, and that the housing 10 is mounted to a frame 52 including platform 50. The platform 50 is rigidly connected by welding, bolting or the like to longitudinally extending frame members 53. Also mounted on platform 52 is a compressor unit 54 for supplying compressed air to the pneumatic tool circuit of the vehicle. Located on the side of vehicle 12 opposite housing 12 is a hydraulic fluid reservoir 56. Hydraulic fluid which has been pumped through the hydraulic tool circuit or to the alternator 90 or compressor 54 is returned to the reservoir through conduit 58 prior to being returned to the hydraulic pump 94 connected to the engine unit 22.

As shown in FIG. 4, the side panel 46 includes a diagonally cut corner 60 on each panel 46 and 48 at the front bottom corner thereof. The housing 10 is mounted by hinge bolt 62 to a flange member 64 welded to platform 50. A similar flange member hingably supports side panel 48. The flange members 64 are provided with a series of holes 66, 68 for enabling securement of the housing 10 in an upright position for ordinary operation. As may be seen in FIG. 4, a securing bolt 70 is inserted through an aperture 72 at the rear of each side panel during normal operations to prevent the housing 10 from pivoting to a horizontal orientation, as shown in FIG. 5 when bolt 70 has been removed. Additional securing bolts 70 may be inserted through holes located between hinge bolt 62 and securing bolt 70.

Housing 10 also includes a plurality of conduit hangers 74, 76, 78, 80, 82 and 84. If it is desired to pivot the housing 10 to a substantially horizontal position as shown in FIG. 5, it is necessary to remove hanger 76 and remove securing bolts 70 from each side panel 46 and 48. Thereafter, housing 10 may simply be pivoted to a horizontal position whereby it is supported by hinge bolt 62 at each side panel 46 and 48 and by platform 50 to present a substantially open and stable condition for maintenance of the components therein, best seen in FIG. 6. It is also to be understood that once so pivoted, hoses 86 may remain connected to the compressor 54 and other components while servicing may be effected through the open rear panel 88.

As may be seen in FIG. 6, the interior of the control housing 10 may include, for example, an electrical generator 90, conduits 86, and various wiring components 92 which may require periodic servicing. When such servicing is complete, the housing 10 may be pivotally returned to an upright position by pivoting housing 10 around hinge bolt 62 and inserting securing bolts 70 to enable the service vehicle 12 to return to its routine operations.

We claim:

1. In a service vehicle having a cab, a pair of longitudinally extending frame members, a wheeled undercarriage including front wheels and rear wheels, power supply means and means for transmitting power generated by said power supply means to a hydraulic circuit, the improvement comprising:
    a hydraulic control circuit housing presenting a front panel and a rear access opening;
    a generally horizontally disposed platform positioned behind said cab between said front wheels and said rear wheels and rigidly connected to said frame; and
    means mounting said housing to said platform for pivotal movement of said housing relative to said platform along an axis generally parallel to said longitudinally extending frame members, said mounting means servicing to mount said housing for pivotal movement between a first, upright position over said platform with said front panel facing generally outwardly and a second, substantially horizontal position with said rear access opening facing generally upwardly and a substantial portion of said housing being located outboard of said platform.

2. A service vehicle as set forth in claim 1 wherein said vehicle presents at least one side, said mounting means being positioned on said platform for pivotal movement of said housing to a horizontal position extending outwardly over said side.

3. A service vehicle as set forth in claim 2 wherein said mounting means includes a pair of spaced apart flange members oriented transversely to said longitudinally extending frame members, said flange members including at least one opening in each flange member for receiving a hinge bolt therethrough, said hinge bolts pivotally mounting said housing.

4. A service vehicle as set forth in claim 3 wherein said housing includes a pair of side panels, each of said side panels being supported by said platform in said upright and said horizontal orientations, each of said side panels including an angled bottom corner portion adjacent said front panel for enabling pivotal movement of said housing between said upright orientation and said outwardly extending horizontal position.

5. In a service vehicle including a hydraulic tool powering circuit having a plurality of outputs including a single hydraulic tool circuit output, means for preventing simultaneous activation of a plurality of inputs to said single tool circuit output comprising:
    a first control lever operatively connected to a first valve;
    a second control lever operatively connected to a second valve, said first and second levers being shiftable in substantially parallel planes between a first valve-opening position for providing hydraulic fluid under pressure to a hydraulic tool circuit output, and a second valve-closing position; and
    an abutment member oriented generally transversely and positioned between said first control lever and said second control lever for abutting engagement therewith for preventing simultaneous positioning of said levers in said open position, said abutment member being mounted for pivotal movement about a mount positioned between said first lever and said second lever, said abutment member being oriented for pivoting in another plane generally transverse to the planes of said levers.

6. A service vehicle including a hydraulic tool powering circuit as set forth in claim 5, wherein each said first valve and said second valve is a three-way valve including a first output and a second output, the first output of each said first valve and said second valve being connected to said single tool circuit output by a shuttle valve, said abutment member serving to prevent a simultaneous supply of hydraulic fluid to said shuttle valve from said first output of each said first valve and said second valve.

7. A service vehicle including a hydraulic tool powering circuit as set forth in claim 6, including a control housing, said first lever, said second lever and said abutment member being externally mounted on said control housing.

* * * * *